United States Patent
Oh et al.

(10) Patent No.: US 11,469,462 B2
(45) Date of Patent: Oct. 11, 2022

(54) SECONDARY BATTERY

(71) Applicant: Samsung SDI Co., Ltd., Yongin-si (KR)

(72) Inventors: Dae Sik Oh, Yongin-si (KR); Hyung Noh Jung, Yongin-si (KR); Yong Seok Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 58 days.

(21) Appl. No.: 16/719,501

(22) Filed: Dec. 18, 2019

(65) Prior Publication Data

US 2020/0335733 A1    Oct. 22, 2020

(30) Foreign Application Priority Data

Apr. 19, 2019  (KR) .......................... 10-2019-0045884

(51) Int. Cl.
*H01M 50/103*  (2021.01)
*H01M 50/10*   (2021.01)

(52) U.S. Cl.
CPC ......... *H01M 50/103* (2021.01); *H01M 50/10* (2021.01)

(58) Field of Classification Search
CPC .......................... H01M 50/103; H01M 50/10
See application file for complete search history.

(56) References Cited

U.S. PATENT DOCUMENTS

| | | | |
|---|---|---|---|
| 8,748,031 B2 | 6/2014 | Kim et al. | |
| 9,583,742 B2 | 2/2017 | Munenaga et al. | |
| 9,905,369 B2 | 2/2018 | Ioka et al. | |
| 9,966,579 B2 | 5/2018 | Lee et al. | |
| 2011/0300423 A1 | 12/2011 | Lee et al. | |
| 2012/0052371 A1 | 3/2012 | Kim et al. | |
| 2012/0189904 A1 | 7/2012 | Kawada et al. | |
| 2012/0301779 A1 | 11/2012 | Munenaga et al. | |
| 2013/0149563 A1 | 6/2013 | Lee et al. | |
| 2016/0372717 A1 | 12/2016 | Noda | |
| 2017/0149024 A1 | 5/2017 | Park et al. | |
| 2017/0149030 A1 | 5/2017 | Lee et al. | |

(Continued)

FOREIGN PATENT DOCUMENTS

| | | |
|---|---|---|
| CN | 102623744 A | 8/2012 |
| CN | 102800888 A | 11/2012 |
| CN | 106803553 A | 6/2017 |

(Continued)

OTHER PUBLICATIONS

Extended European Search Report for corresponding European Patent Application No. 20159852.1, dated Aug. 18, 2020, 6 pages.

(Continued)

*Primary Examiner* — Jane J Rhee
(74) *Attorney, Agent, or Firm* — Lewis Roca Rothgerber Christie LLP

(57) ABSTRACT

A secondary battery includes: an electrode assembly; a case accommodating the electrode assembly, and a cap assembly coupled to the case to seal the case, and the case includes a bottom portion, long side portions bent and extended from the bottom portion, a first short side portion bent and extended from the bottom portion, second short side portions bent and extended from the long side portions, the first short side portion and the second short side portions connected to each other to define a short side portion, and protrusions located between the first short side portion and the second short side portions.

15 Claims, 9 Drawing Sheets

(56) References Cited

U.S. PATENT DOCUMENTS

2019/0036088 A1    1/2019    Wakimoto

FOREIGN PATENT DOCUMENTS

| EP | 2528132 A2 | 11/2012 |
|---|---|---|
| EP | 2528132 A3 | 12/2014 |
| EP | 3174126 A1 | 5/2017 |
| EP | 3726603 A1 | 10/2020 |
| JP | H06-321235 A | 11/1994 |
| JP | 2001-236929 A | 8/2001 |
| JP | 2002-198011 A | 7/2002 |
| JP | 2012-133913 A | 7/2012 |
| JP | 2013-008665 A | 1/2013 |
| JP | 2013-235730 A | 11/2013 |
| JP | 6050606 B2 | 12/2016 |
| JP | 2017-200707 A | 11/2017 |
| JP | 2019-029218 A | 2/2019 |
| KR | 10-1155889 B1 | 6/2012 |
| KR | 10-2013-0065291 A | 6/2013 |
| KR | 10-2014-0004835 A | 1/2014 |
| KR | 10-1704981 B1 | 2/2017 |
| WO | WO 2016/203342 A1 | 12/2016 |

OTHER PUBLICATIONS

EPO Extended Search Report dated May 19, 2020, corresponding to European Patent Application No. 20151695.2 (7 pages).
EPO Extended European Search Report dated Sep. 18, 2020, corresponding to European Patent Application No. 20163787.3 (7 pages).
U.S. Office Action dated Jun. 18, 2021, issued in U.S. Appl. No. 16/719,521 (18 pages).
U.S. Office Action dated Jun. 10, 2021, issued in U.S. Appl. No. 16/719,578 (7 pages).
U.S. Final Office Action dated Nov. 1, 2021, issued in U.S. Appl. No. 16/719,578 (5 pages).
U.S. Final Office Action dated Nov. 24, 2021, issued in U.S. Appl. No. 16/719,521 (19 pages).
U.S. Advisory Action dated Jan. 12, 2022, issued in U.S. Appl. No. 16/719,578 (3 pages).
Office Action, with English translation, dated Feb. 21, 2022, for related Chinese Application No. CN 202010039940.7 (16 pages).
Notice of Allowance for related U.S. Appl. No. 16/719,578, dated Feb. 14, 2022 (7 pages).
Advisory Action for related U.S. Appl. No. 16/719,521, dated Feb. 1, 2022 (3 pages).
Office Action dated Mar. 2, 2022 in European Patent Application No. 20163787.3 (4 pages).
Office Action dated Apr. 11, 2022 in U.S. Appl. No. 16/719,521 (25 pages).
U.S. Notice of Allowance from U.S. Appl. No. 16/719,578, dated May 12, 2022, 7 pages.

SECONDARY BATTERY

CROSS-REFERENCE TO RELATED APPLICATION

This application claims priority to and the benefit of Korean Patent Application No. 10-2019-0045884, filed on Apr. 19, 2019 in the Korean Intellectual Property Office, the entire content of which is herein incorporated by reference.

BACKGROUND

1. Field

Aspects of embodiments of the present invention relate to a secondary battery.

2. Description of the Related Art

A battery may be classified as a prismatic type, a cylindrical type, a pouch type, etc., according to the shape of a case. A prismatic or cylindrical battery may be manufactured by inserting an electrode assembly having a positive electrode, a negative electrode, and a separator into a metal can, or case, and sealing the electrode assembly, while a pouch type battery may be manufactured by enclosing an electrode assembly using an aluminum foil coated with an insulator.

Traditional battery can manufacturing methods may include a deep drawing process, an impact process, and so on. In an example, the deep drawing process is performed such that a sheet-shaped metal plate is placed on a molding die and punching operations are performed on the metal plate about ten times using a punch, thereby completing the can. In another example, the impact process is performed such that a slug in the form of a billet is placed on a molding die and a strong punching operation is performed on the slug about one time using a punch, thereby completing the can. The impact process can reduce the number of processing steps, thereby lowering the manufacturing cost.

However, the conventional deep drawing process and the conventional impact process are both limited in reducing a can thickness due to the respective manufacturing process characteristics and reveal a large deviation in the thickness of the can according to the area of the can. In addition, the conventional deep drawing process and the conventional impact process are problematic in that the manufacturing cost of the battery can is quite high.

The above information disclosed in this Background section is only for enhancement of understanding of the background of the described technology and, therefore, it may contain information that does not form the prior art that is already known in this country to a person of ordinary skill in the art.

SUMMARY

According to an aspect of embodiments of the present invention, a secondary battery has a bending type can, or case, which has no thickness deviation in various areas of the can by reducing the thickness of the can and increasing dimension accuracy, and which has improved safety by providing curved portions at corners where three or four sides meet.

According to another aspect of embodiments of the present invention, a secondary battery has a bending type can, or case, which includes desirably shaped curved portions by providing protrusions at corners where three or four sides meet, the protrusions overlapping with each other when the corners are bent, thereby preventing or substantially preventing pinholes from being generated during welding.

According to one or more embodiments of the present invention, a secondary battery includes an electrode assembly, a case accommodating the electrode assembly, and a cap assembly coupled to the case to seal the case, wherein the case includes a bottom portion, long side portions bent and extended from the bottom portion, a first short side portion bent and extended from the bottom portion, second short side portions bent and extended from the long side portions, the first short side portion and the second short side portions connected to each other to define a short side portion, and protrusions located between the first short side portion and the second short side portions.

The protrusions may be located at regions where the first short side portion and the second short side portions meet.

The protrusions may include a first protrusion located in the first short side portion, and a second protrusion located in each of the second short side portions.

The first protrusion and the second protrusion may overlap with each other.

The first protrusion and the second protrusion may be in an asymmetric configuration.

The first protrusion may be larger than the second protrusion.

The second protrusion may be larger than the first protrusion.

The first and second protrusions may be circular, triangular, quadrangular, pentagonal, or hexagonal.

The first protrusion may have a larger curvature radius than the second protrusion.

The second protrusion may have a larger curvature radius than the first protrusion.

The secondary battery may further include curved portions located at regions where the bottom portion, the long side portions, and the short side portions including the first short side portion including the first protrusion and the second short side portion including the second protrusion, meet.

The short side portion may further include welding portions, and the welding portions may include a first welding portion located between each of the curved portions and each of the first short side portion and the second short side portions, and a second welding portion located between the second short side portions.

The protrusions may be located at centers of regions where the first short side portion and the second short side portions meet.

The protrusions may be connected longer to the first short side portion than to the second short side portions, or the protrusions may be connected longer to the second short side portions than to the first short side portion.

The protrusions may be separately provided to be inserted between the first short side portion and the second short side portions.

The first short side portion may extends from both end portions of the bottom portion, the second short side portions may extend from both ends of the long side portions, and the short side portion may be defined on both sides of the bottom portion and the long side portions.

As described above, according to an aspect of embodiments of the present invention, a secondary battery having a bending type can is provided, which has no thickness deviation in various areas of the can by reducing the thickness of the can and increasing dimension accuracy, and which can improve safety by providing curved portions at corners where three or four sides meet. In some examples, asymmetrical protrusions are provided at vertexes (corners) where the first short side portion bent from the bottom portion and the second short side portions bent from the long side portions meet, such that the asymmetrical protrusions overlap with each other when they are bent, thereby providing desirably shaped, symmetrical curved portions at the corners where the bottom portion, the long side portions, the first short side portion, and the second short side portions meet.

In addition, according to another aspect of embodiments of the present invention, a secondary battery having a bending type can is provided, which includes desirably shaped curved portions by providing protrusions at corners where three or four sides meet, the protrusions overlapping with each other when the corners are bent, thereby preventing or substantially preventing pinholes from being generated during welding. In some examples, according to an aspect of embodiments of the present invention, desirably shaped, symmetrical curved portions are provided by the asymmetrical protrusions overlapping with each other, and boundary regions between the first and second short side portions are spaced by a distance (e.g., a predetermined distance) apart from the curved portions, thereby easily performing welding without pinholes being generated at the curved portions and the boundary regions.

DESCRIPTION OF REFERENCE NUMERALS

Figure 1:
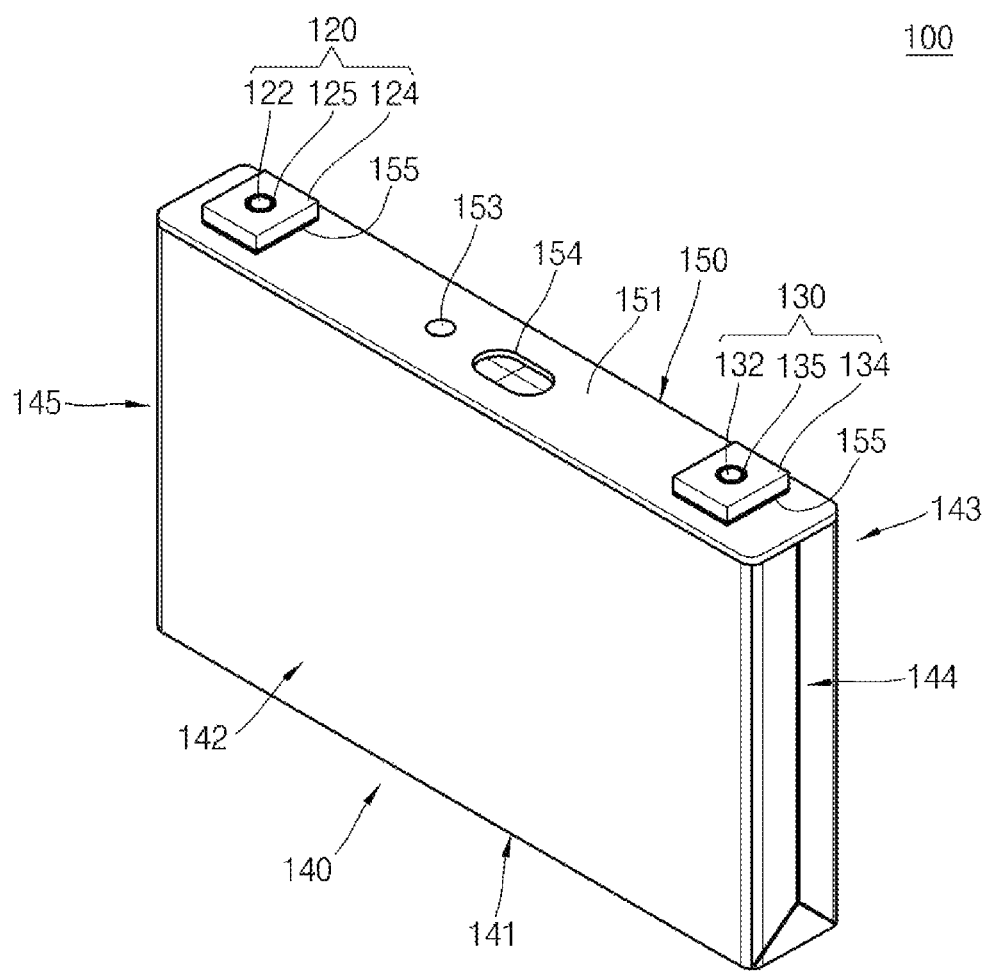
FIG. 1 is a perspective view illustrating a secondary battery according to an example embodiment of the present invention.

| | |
|---|---|
| 100, 200: Secondary battery | 110: Electrode assembly |
| 120: First terminal | 130: Second terminal |
| 140: Can | 140A: Metal plate |
| 141: Bottom portion | 142, 143: Long side portion |
| 144, 145: Short side portion | 146: Welding portion |
| 147: Opening | 1440A, 1440B: Protrusions |
| 1441: First protrusion | 1442: Second protrusion |
| 1550A, 1550B: Curved portion | |

DETAILED DESCRIPTION

Herein, some example embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, it is to be understood that when an element A is referred to as being "connected to" an element B, the element A may be directly connected to the element B or one or more intervening elements C may be present and the element A and the element B may be indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

The term "welding portion" used throughout this specification can be referred to as a temporary welding portion and/or a welding portion in some cases, which is for representing the welding sequence and function but is not intended to limit the invention. In addition, the term "welding" as used herein mainly means laser welding, and examples of a laser used for welding may include, but are not limited to, $CO_2$ laser, fiber laser, disk laser, semiconductor laser, and/or yttrium aluminum garnet (YAG) laser. In addition, the terms "second short side portion" and "third short side portion" may be referred to as second short side portions, in some cases.

Unless otherwise defined, all terms used herein (including technical or scientific terms) have the same meanings as those generally understood by those skilled in the art to which the inventive concept pertains. Such terms as those defined in a generally used dictionary are to be interpreted as having meanings equal to the contextual meanings in the relevant field of art, and are not to be interpreted as having idealized or excessively formal meanings unless clearly defined herein.

FIG. 1 is a perspective view illustrating a secondary battery according to an example embodiment of the present invention. In the example shown in FIG. 1, a secondary battery 100 may include an electrode assembly 110 (110 and 210 in the examples shown in FIGS. 2A and 2B), a first terminal 120, a second terminal 130, a can, or case, 140, and a cap assembly 150.

In some examples, the can 140 may be provided by blanking and/or notching, bending, and welding a metal plate and may have a substantially hexahedral shape having an opening through which the electrode assembly 110 is inserted and placed and the cap assembly 150 is mounted. In some examples, the can 140 may include a rectangular bottom portion 141 having long sides and short sides, long side portions 142 and 143 bent and extended from the respective long sides of the bottom portion 141 to the cap assembly 150, and short side portions 144 and 145 extended from the respective short sides of the bottom portion 141 and the long side portions 142 and 143.

In FIG. 1, the can 140 and the cap assembly 150 assembled to each other are illustrated, such that the opening, which is a substantially opened part of a region corresponding to the cap assembly 150, is not illustrated in FIG. 1. In an embodiment, the interior surface and/or the exterior surface of the can 140 may be subjected to insulation treatment such that the can 140 is insulated from the electrode assembly, the first terminal 120, the second terminal 130, and the cap assembly 150.

Figure 2A:
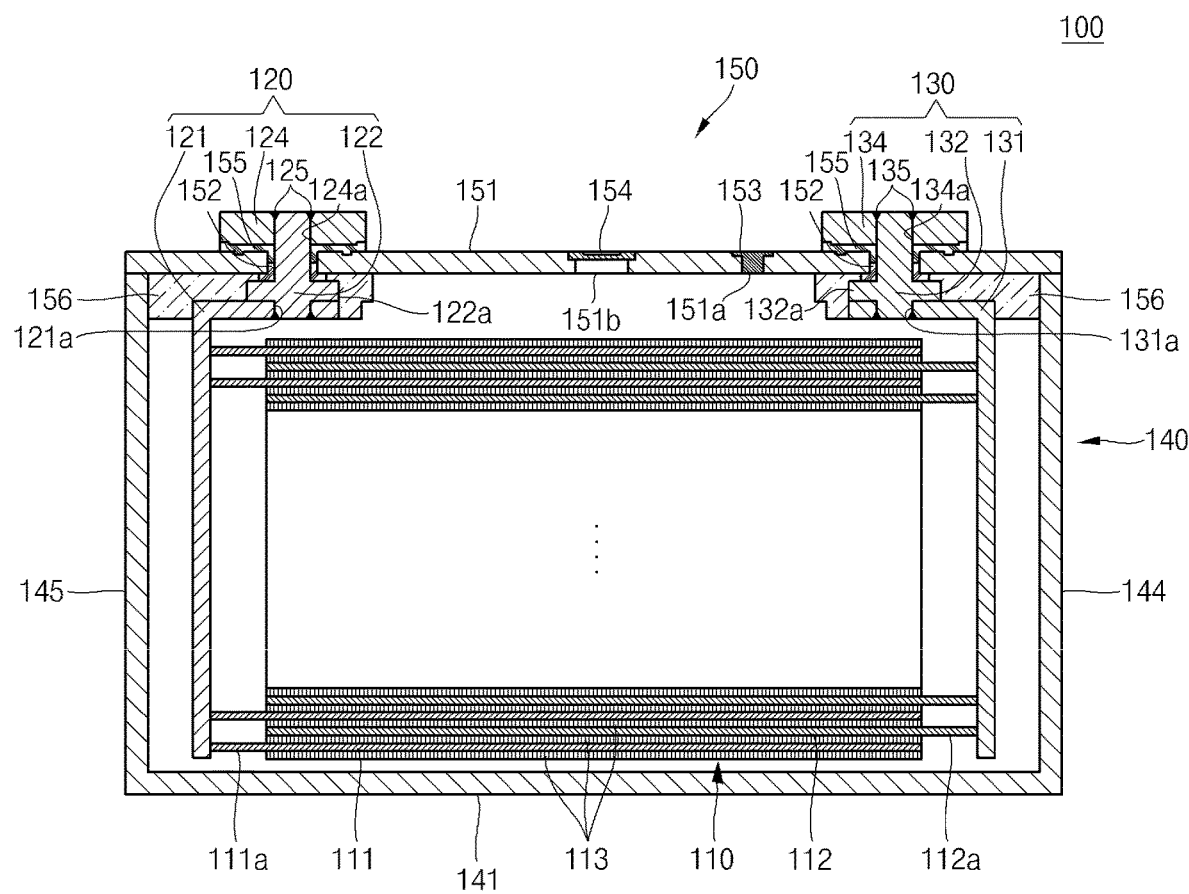
FIGS. 2A and 2B are cross-sectional views illustrating secondary batteries according to example embodiments of the present invention.
Figure 2B:
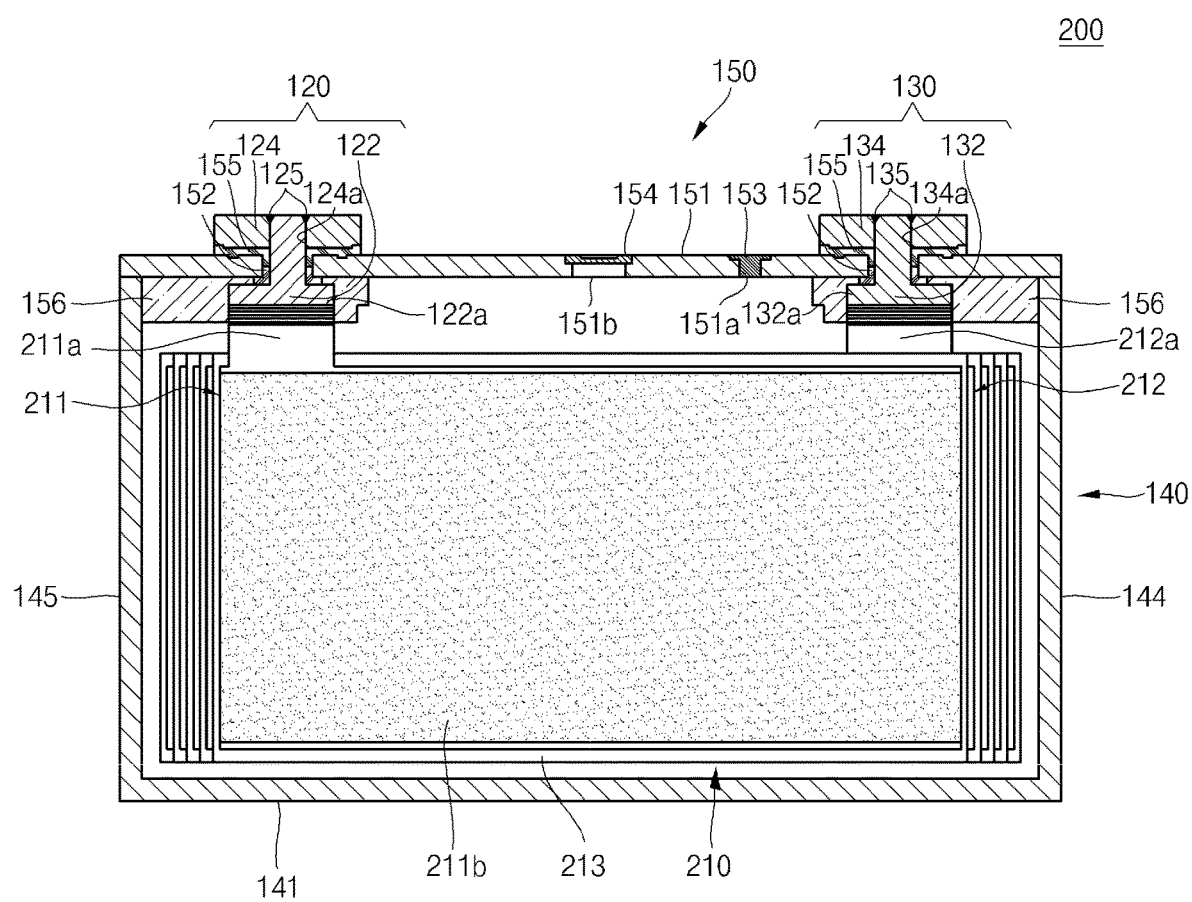

FIGS. 2A and 2B are cross-sectional views illustrating secondary batteries 100 and 200 according to example embodiments of the present invention. In the example shown in FIG. 2A, the secondary battery 100 may include the electrode assembly 110 having a winding axis extending in a horizontal direction (i.e., in a direction substantially parallel with a lengthwise direction of the cap assembly 150). In the example shown in FIG. 2B, the secondary battery 200 may include an electrode assembly 210 having a winding axis extending in a vertical direction (i.e., in a direction substantially perpendicular to the lengthwise direction of the cap assembly 150). In some example embodiments, the electrode assembly may be a stacked electrode assembly, rather than a wound electrode assembly.

The secondary battery 100 shown in FIG. 2A will now be described. The electrode assembly 110 may be formed by winding or stacking a stacked structure including a first electrode plate 111, a separator 113, and a second electrode plate 112, which are thin plates or layers. In some examples, the first electrode plate 111 may operate as a negative electrode and the second electrode plate 112 may operate as a positive electrode, or vice versa. In some examples, the first electrode plate 111 may be formed by coating a first active material, such as graphite or carbon, on a first electrode collector made of a metal foil, such as copper, a copper alloy, nickel, or a nickel alloy, and may include a first uncoated portion 111a that is not coated with the first active material. In some examples, the second electrode plate 112 may be formed by coating a second active material, such as a transition metal oxide, on a second electrode collector made of a metal foil, such as aluminum or an aluminum alloy, and may include a second uncoated portion 112a that is not coated with the second electrode material. In some examples, the separator 113, which is located between the first and second electrode plates 111 and 112, may prevent or substantially prevent short circuits between the first and second electrode plates 111 and 112, and may allow lithium ions to move. In an embodiment, the separator 113 may include polyethylene, polypropylene, or a composite film of polyethylene and polypropylene. In an embodiment, the separator 113 may be replaced by an inorganic solid electrolyte, such as a sulfide-based compound, an oxide-based compound, or a sulphate compound, such as not to necessitate a liquid- or gel-phase electrolyte solution. The first terminal 120 and the second terminal 130 electrically connected to the first electrode plate 111 and the second electrode plate 112, respectively, are located at opposite ends of the electrode assembly 110. In some examples, the electrode assembly 110 may be accommodated in the can 140 with an electrolytic solution. In some examples, the electrolytic solution may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$ or $LiBF_4$. In some examples, if the inorganic solid electrolyte is used, the electrolytic solution may be omitted.

The first terminal 120 may be made of a metal and may be electrically connected to the first electrode plate 111. In some examples, the first terminal 120 may include a first collector plate 121, a first terminal pillar 122, and a first terminal plate 124. In some examples, the first collector plate 121 may be brought into contact with the first uncoated portion 111a protruding to an end of the electrode assembly 110. In an embodiment, the first collector plate 121 may be welded to the first uncoated portion 111a. In some examples, the first collector plate 121 may be substantially in an inverted L-shaped ("Γ") configuration and may have a terminal hole 121a located in a top portion thereof. In some examples, the first terminal pillar 122 may be inserted into the terminal hole 121a, followed by riveting and/or welding. In some examples, the first collector plate 121 may be made of copper or a copper alloy. In some examples, the first terminal pillar 122 penetrates the cap plate 151 to be described later and is electrically connected to the first collector plate 121 under the cap plate 151. In addition, in some examples, while the first terminal pillar 122 is upwardly protruded and extended to an upper portion of the cap plate 151 by a length (e.g., a predetermined length), a flange 122a may be located below the cap plate 151 to prevent or substantially prevent the first terminal pillar 122 from being dislodged from the cap plate 151. In an embodiment, a portion of the first terminal pillar 122 positioned below the flange 122a is fitted into the first terminal hole 121a of the first collector plate 121, followed by riveting and/or welding. In some examples, the first terminal pillar 122 may be electrically insulated from the cap plate 151. In some examples, boundary regions of the upwardly exposed first terminal pillar 122 and the first terminal plate 124 may be welded to each other. For example, a laser beam may be supplied to the boundary regions of the upwardly exposed first terminal pillar 122 and the first terminal plate 124 to melt the boundary regions, followed by cooling, thereby welding the boundary regions. The welded regions are designated by reference numeral 125 in FIG. 2A. In an embodiment, a bus bar made of aluminum or an aluminum alloy may be welded to the first terminal plate 124.

The second terminal 130 may also be made of a metal and may be electrically connected to the second electrode plate 112. In some examples, the second terminal 130 may include a second collector plate 131, a second terminal pillar 132, and a second terminal plate 134. In some examples, the second collector plate 131 may be brought into contact with the second uncoated portion 112a protruding to an end of the electrode assembly 110. In some examples, the second collector plate 131 may be substantially in an inverted L-shaped ("ℏ") configuration and may have a terminal hole 131a located in a top portion thereof. In some examples, the second terminal pillar 132 may be inserted into the terminal hole 131a and then coupled thereto. In some examples, the second collector plate 131 may be made of, for example, but is not limited to, aluminum or an aluminum alloy. In some examples, the second terminal pillar 132 penetrates the cap plate 151 to be described later and is electrically connected to the second collector plate 131 under the cap plate 151. In addition, in some examples, while the second terminal pillar 132 is upwardly protruded and extended to an upper portion of the cap plate 151 by a length (e.g., a predetermined length), a flange 132a may be located below the cap plate 151 to prevent or substantially prevent the second terminal pillar 132 from being dislodged from the cap plate 151. In an embodiment, a portion of the second terminal pillar 132 positioned below the flange 132a is fitted into the second terminal hole 131a of the second collector plate 131, followed by riveting and/or welding. In an embodiment, the second terminal pillar 132 may be electrically insulated from the cap plate 151. In some examples, the second terminal pillar 132 may be made of aluminum or an aluminum alloy. The second terminal plate 134 has a hole 134a. In addition, the second terminal plate 134 is coupled to the second terminal pillar 132. That is, the second terminal pillar 132 is coupled to the hole 134a of the second terminal plate 134. In an embodiment, the second terminal pillar 132 and the second terminal plate 134 may be riveted and/or welded to each other. In some examples, boundary regions of the upwardly exposed second terminal pillar 132 and the second terminal plate 134 may be welded to each other. For example, a laser beam may be supplied to the boundary regions of the upwardly exposed second terminal pillar 132 and the second terminal plate 134 to melt the boundary regions, followed by cooling, thereby welding the boundary regions. The welded regions are designated by reference numeral 135 in FIG. 2A. In an embodiment, a bus bar made of aluminum or an aluminum alloy may be easily welded to the second terminal plate 134. In an embodiment, the second terminal plate 134 may be electrically connected to the cap plate 151. Thus, the cap plate 151 and the can 140, which will be described below, may have the same polarity as the second terminal 130 (e.g., a positive polarity).

The cap assembly 150 may be coupled to the can 140. In some examples, the cap assembly 150 may include the cap plate 151, a seal gasket 152, a plug 153, a safety vent 154, an upper coupling member 155, and a lower insulating member 156. The cap plate 151 may seal the opening of the case 140, and may be made of the same material as the case 140. In some examples, the cap plate 151 may be coupled to the can 140 by laser welding. As described above, in an embodiment, since the cap plate 151 has the same polarity as the second terminal 130, the cap plate 151 and the can 140 may have the same polarity. The seal gasket 152 made of an insulating material may be located between each of the first terminal pillar 122 and the second terminal pillar 132 and the cap plate 151 at a bottom end of the cap plate 151 and may seal regions between each of the first terminal pillar 122 and the second terminal pillar 132 and the cap plate 151. The seal gasket 152 may prevent or substantially prevent external moisture from permeating into the secondary battery 100 or prevent or substantially prevent the electrolyte accommodated in the secondary battery 100 from being effused outside. The plug 153 may seal an electrolyte injection hole 151a of the cap plate 151. The safety vent 154 may be installed in a vent hole 151b of the cap plate 151 and may have a notch configured to be openable at a preset pressure. The upper coupling member 155 may be located between each of the first terminal pillar 122 and the second terminal pillar 132 and the cap plate 151 at a top end of the cap plate 151. In addition, the upper coupling member 155 may closely contact the cap plate 151. In addition, the upper coupling member 155 may also closely contact the seal gasket 152. The upper coupling member 155 may insulate the first terminal pillar 122 and the second terminal pillar 132 from the cap plate 151. In some examples, the upper coupling member 155 located at the second terminal pillar 132 may electrically connect the second terminal plate 134 and the cap plate 151 to each other. Accordingly, the second terminal 130 may have the same polarity as the cap plate 151 and the can 140. The lower insulating member 156 may be located between each of the first collector plate 121 and the second collector plate 131 and the cap plate 151 and may prevent or substantially prevent an unnecessary short circuit from being generated. That is, the lower insulating member 156 may prevent or substantially prevent short circuits from being generated between the first collector plate 121 and the cap plate 151 and between the second collector plate 131 and the cap plate 151.

The secondary battery 200 shown in FIG. 2B will now be described. The secondary battery 200 is different from the secondary battery 100 described above in terms of the construction of the electrode assembly 210 and the connection relationships between the electrode assembly 210 and each of the terminals 120 and 130. A first electrode tab 211a may be positioned between the electrode assembly 210 and a first terminal pillar 122 of a first terminal 120, and a second electrode tab 212a may be positioned between the electrode assembly 210 and a second terminal pillar 132 of a second terminal 130. The first electrode tab 211a may be extended from a top end of the electrode assembly 210 to a bottom end of the first terminal pillar 122 of the first terminal 120 to be electrically connected or welded to a planar flange 122a provided in the first terminal pillar 122. In addition, the second electrode tab 212a may be extended from a top end of the electrode assembly 210 to a bottom end of the second terminal pillar 132 of the second terminal 130 to be electrically connected or welded to a planar flange 132a provided in the second terminal pillar 132. The first electrode tab 211a may be either a first uncoated portion of the first electrode plate 211 of the electrode assembly 210, which is not coated with a first active material 211b, or a separate member connected to the first uncoated portion. Here, the first uncoated portion may be made of a same material as the first electrode plate 211, and the separate member may be one selected from the group consisting of nickel, a nickel alloy, copper, a copper alloy, aluminum, an aluminum alloy, and equivalents thereof. In addition, the second electrode tab 212a may be either a second uncoated portion of the second electrode plate 212 of the electrode assembly 210, which is not coated with a second active material, or a separate member connected to the second uncoated portion. Here, the second uncoated portion may be made of a same material as the second electrode plate 212, and the separate member may be one selected from the group consisting of aluminum, an aluminum alloy nickel, a nickel alloy, copper, a copper alloy, and equivalents thereof.

As described above, since a winding axis of the electrode assembly and terminal axes of the terminals are parallel or horizontal with each other, the electrode assembly has excellent electrolyte impregnation capability when an electrolyte is injected, and internal gases are rapidly transferred to a safety vent during overcharging to facilitate the safety vent 154 quickly operating. In addition, electrode tabs (uncoated portions or separate members) of the electrode assembly are directly electrically connected to the terminals, which shortens electrical paths, thereby reducing internal resistance of the secondary battery 200 while reducing the number of components of the secondary battery 200.

The can 140 manufactured by an example method, which will be described below, may be employed to the secondary batteries 100 and 200 shown in FIGS. 1, 2A, and 2B.

Figure 3A:
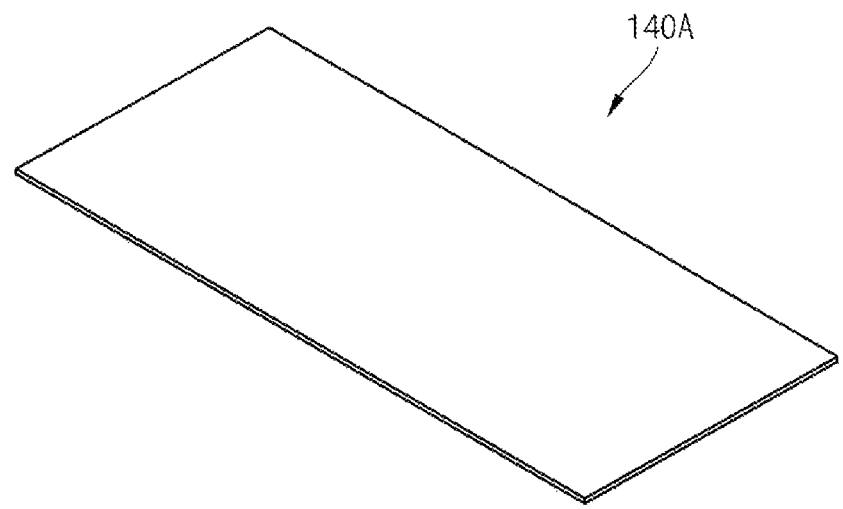
FIGS. 3A and 3B are perspective views illustrating a method for manufacturing a secondary battery according to an example embodiment of the present invention.
Figure 3B:
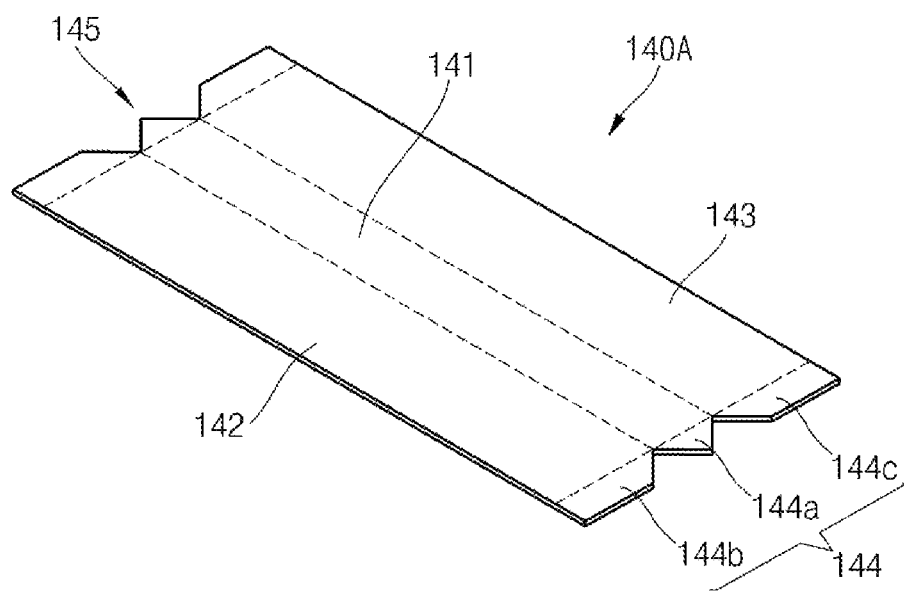

FIGS. 3A and 3B are perspective views illustrating a method for manufacturing a secondary battery 100, 200 according to an example embodiment of the present invention. FIG. 3A shows a can 140 at an initial stage of manufacture.

In the example shown in FIG. 3A, a substantially planar metal plate 140A having a uniform thickness may be provided. In some example embodiments, the metal plate 140A may include aluminum (Al), iron (Fe), copper (Cu), titanium (Ti), nickel (Ni), magnesium (Mg), chromium (Cr), manganese (Mn), zinc (Zn), or alloys of these elements. In some example embodiments, the metal plate 140A may include nickel (Ni) plated iron (Fe) or SUS (e.g., SUS 301, SUS 304, SUS 305, SUS 316L, or SUS 321).

In addition, in some example embodiments, the metal plate 140A may have a thickness in a range from approximately 0.1 mm to approximately 10 mm, and a deviation in the thickness of the metal plate 140A in all areas may be in a range from approximately 0.1% to approximately 1%. Therefore, the present invention may provide the can 140 that is relatively thin and has a small thickness deviation, compared to a conventional can.

In addition, in some examples, the metal plate 140A may be preprocessed to facilitate a bending process, a notching process, a bending process, and/or a welding process, which will be described below. In some examples, the metal plate 140A may be subjected to annealing treatment performed in a predetermined gas atmosphere and a predetermined temperature range for a predetermined period of time. In some examples, the annealing treatment may be performed in an atmosphere of inert gas, such as argon (Ar) or nitrogen ($N_2$) at a temperature ranging from approximately 300° C. to approximately 1000° C. for approximately 10 seconds to approximately 60 minutes. The annealing treatment may increase the elastic modulus of the metal plate 140A by approximately 5% to approximately 60%. Accordingly, the bending process of the metal plate 140A, which will later be described, may be easily performed, and occurrence of a spring-back phenomenon can be minimized or reduced, particularly after the bending process.

In an embodiment, the metal plate 140A may have a substantially planar top surface and a substantially planar bottom surface. In an embodiment, the top surface and/or the bottom surface of the metal plate 140A may be subjected to insulation treatment. In some examples, a thin insulation film may be located on the top surface of metal plate 140A by forming a thin oxide layer (e.g., an anodizing layer) through a metal oxidation process, or coating or laminating an insulation resin (e.g., polyimide, polypropylene, or polyethylene). In some examples, the top surface of the metal plate 140A may correspond to the interior surface of the can 140, and the bottom surface of the metal plate 140A may correspond to the exterior surface of the can 140. These features of the metal plate 140A may be commonly applied to all of the metal plates disclosed in the following embodiments.

FIG. 3B shows a can 140 at a later stage of manufacture.

In the example shown in FIG. 3B, a substantially planar metal plate 140A having a uniform thickness may be provided using a blanking process and/or a notching process. In some examples, the metal plate 140A may include a substantially rectangular bottom portion 141 having long sides and short sides, long side portions 142 and 143 (to later be bent from the bottom portion) horizontally extended from the respective long sides of the bottom portion 141, and short side portions 144 and 145 (to later be bent from the bottom portion and the long side portions) horizontally extended from the bottom portion 141 and the respective long side portions 142 and 143.

In some examples, one of the short side portions 144 may include a first short side portion 144a extended from the short side of the bottom portion 141 in a substantially triangular shape, a second short side portion 144b horizontally extended from an end of the long side portion 142, and a third short side portion 144c horizontally extended from an end of the long side portion 143. Here, the second short side portion 144b may include an inclined periphery located at a region facing the first short side portion 144a, and the third short side portion 144c may also include an inclined periphery located at a region facing the first short side portion 144a. In other words, the second and third short side portions 144b and 144c may be matched with or correspond to the first short side portion 144a. In addition, the width of each of the long side portions 142 and 143 may be substantially equal to that of each of the long sides of the bottom portion 141. In addition, the width of the first short side portion 144a may be substantially equal to that of each of the short sides of the bottom portion 141. In addition, the overall width of the second and third short side portions 144b and 144c may be substantially equal to the width of each of the short sides of the bottom portion 141. In addition, the length of each of the long side portions 142 and 143 may be substantially equal to that of each of the short side portions 144 and 145. In FIG. 3B, dashed lines indicate bending lines in a subsequent process to be described later.

Figure 4A:
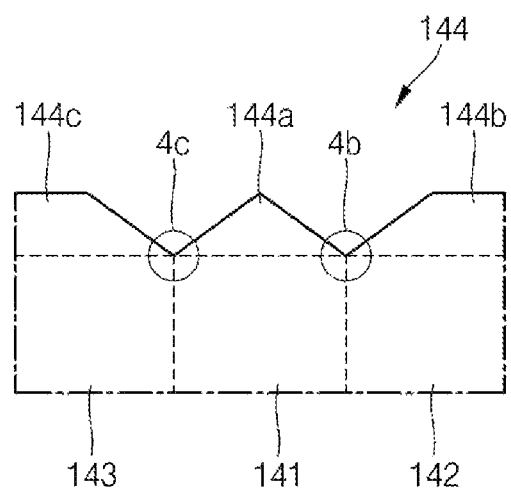
FIGS. 4A to 4C are partially enlarged plan views illustrating a method for manufacturing an example secondary battery according to an example embodiment of the present invention.
Figure 4B:
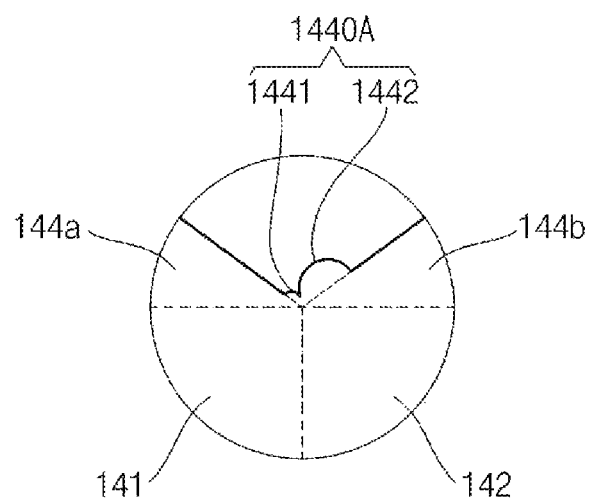
Figure 4C:
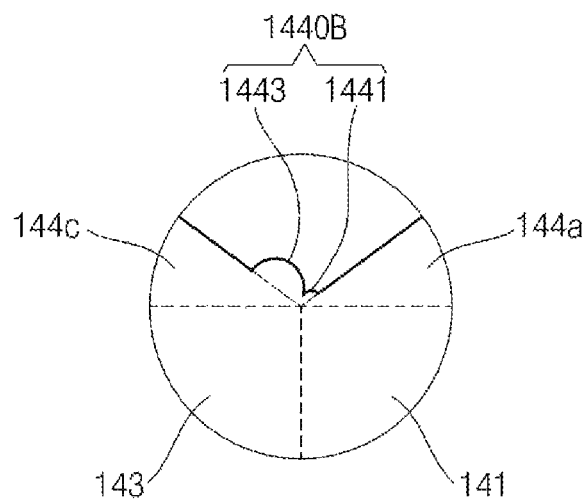

FIGS. 4A to 4C are partially enlarged plan views illustrating a method for manufacturing a secondary battery according to an example embodiment of the present invention. For clarity and brevity, FIG. 4A shows a first short side portion 144a extended from a bottom portion 141, and second and third short side portions 144b and 144c extended from the long side portions 142 and 143, respectively.

As shown in FIG. 4B, in some examples, in a region "4b," at least one or more protrusions 1440A may be provided between the first short side portion 144a and the second short side portion 144b, for example, a region where the first short side portion 144a and the second short side portion 144b meet, a connecting region where the first short side portion 144a and the second short side portion 144b are connected to each other, a vertex between the first short side portion 144a and the second short side portion 144b, a corner between the first short side portion 144a and the second short side portion 144b, or a corner joint region between the first short side portion 144a and the second short side portion 144b.

In addition, as shown in FIG. 4C, in some examples, in a region "4c," at least one or more protrusions 1440B may be provided between the first short side portion 144a and the third short side portion 144c, for example, a region where the first short side portion 144a and the third short side portion 144c meet, a connecting region where the first short side portion 144a and the third short side portion 144c are connected to each other, a vertex between the first short side portion 144a and the third short side portion 144c, a corner between the first short side portion 144a and the third short side portion 144c, or a corner joint region between the first short side portion 144a and the third short side portion 144c.

In some examples, the protrusions 1440A may include a first protrusion 1441 located in the first short side portion 144a, and a second protrusion 1442 located in the second short side portion 144b.

In addition, in some examples, the protrusions 1440B may include a first protrusion 1441 located in the first short side portion 144a, and a third protrusion 1443 located in the third short side portion 144c.

In addition, in some examples, the first protrusion 1441 and the second protrusion 1442 may be in an asymmetric configuration. In addition, in some examples, the first protrusion 1441 and the third protrusion 1443 may be in an asymmetric configuration.

As shown in FIG. 4B, in some examples, the first protrusion 1441 may have a smaller area than the second protrusion 1442. In addition, as shown in FIG. 4C, in some examples, the first protrusion 1441 may have a smaller area than the third protrusion 1443, or vice versa.

In some examples, the first, second, and third protrusions 1441, 1442, and 1443 may be circular, triangular, quadrangular, pentagonal, or hexagonal. In addition, in some examples, if the first, second, and third protrusions 1441, 1442, and 1443 are circular, the first protrusion 1441 may have a smaller curvature radius than the second protrusion 1442. In addition, the first protrusion 1441 may have a smaller curvature radius than the third protrusion 1443.

Figure 5A:
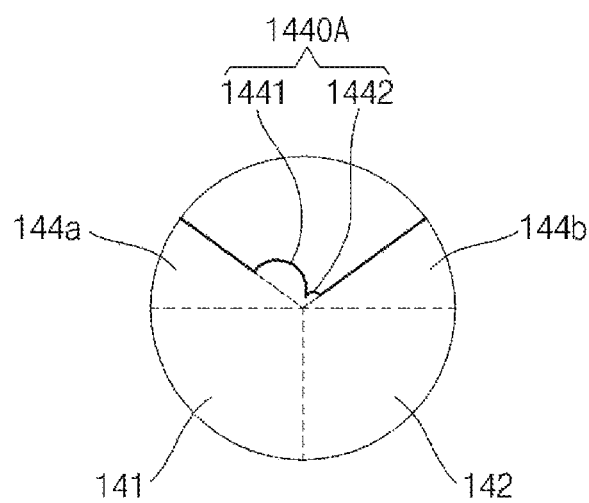
FIGS. 5A and 5B are partially enlarged plan views illustrating a method for manufacturing an example secondary battery according to an example embodiment of the present invention.
Figure 5B:
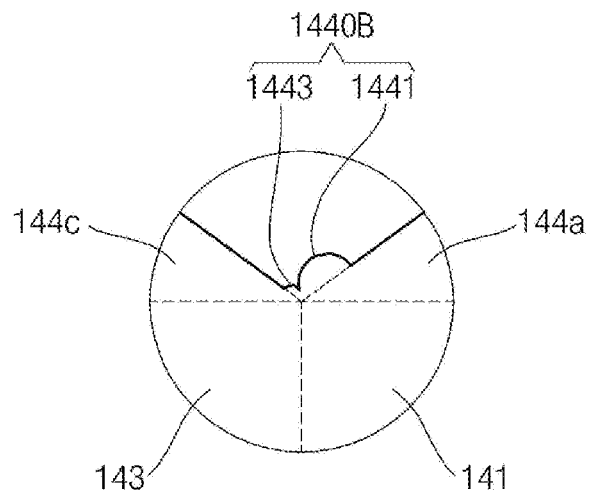

FIGS. 5A and 5B are partially enlarged plan views illustrating a method for manufacturing a secondary battery according to an example embodiment of the present invention. As shown in FIG. 5A, in some examples, the first protrusion 1441 may be larger (e.g., have a larger area) than the second protrusion 1442. In addition, as shown in FIG. 5B, in some examples, the first protrusion 1441 may be larger (e.g., have a larger area) than the third protrusion 1443. In some examples, if the first, second, and third protrusions 1441, 1442, and 1443 are circular, the first protrusion 1441 may have a larger curvature radius than the second protrusion 1442. In addition, in some examples, the first protrusion 1441 may have a larger curvature radius than the third protrusion 1443.

In some examples, the first, second, and third protrusions 1441, 1442, and 1443 are provided by blanking and/or notching the metal plate 140A. Therefore, thicknesses of the first, second, and third protrusions 1441, 1442, and 1443 may be equal to or similar to those of the bottom portion 141, the first short side portion 144a, the second short side portion 144b, and the third short side portion 144c.

Figure 6A:
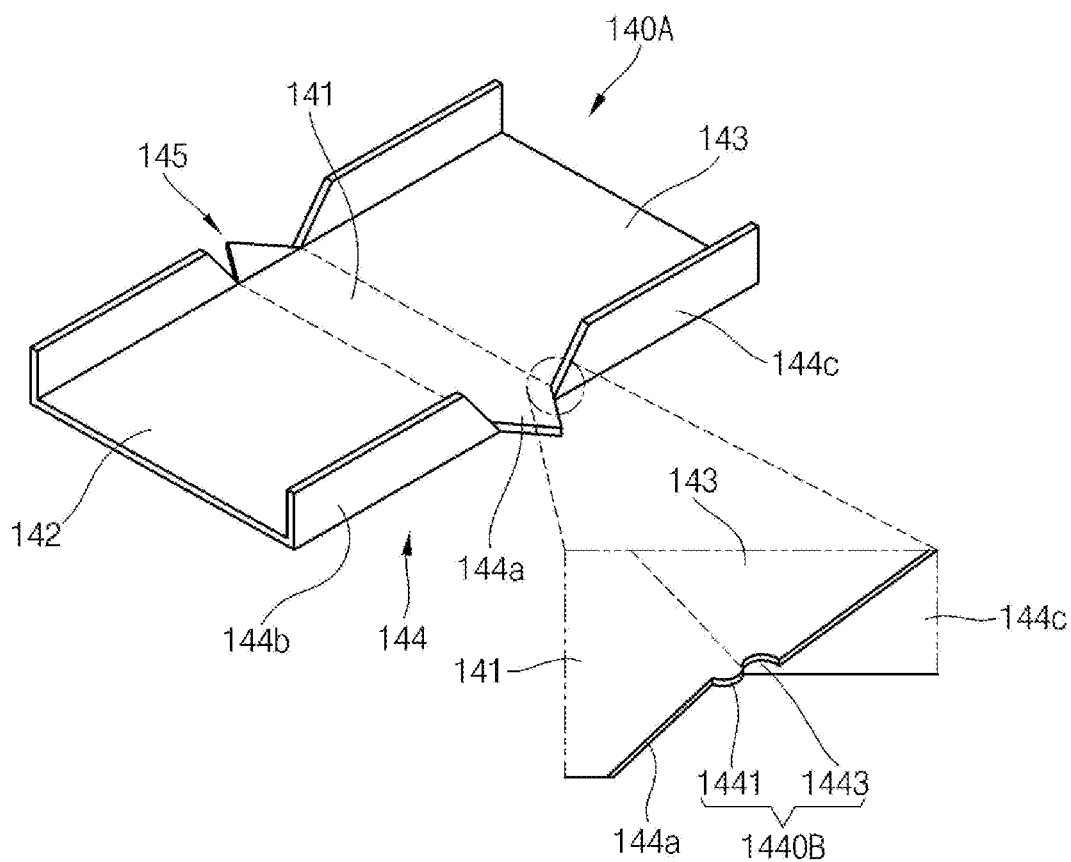
FIGS. 6A to 6C are perspective views illustrating a method for manufacturing a secondary battery according to an example embodiment of the present invention.
Figure 6B:
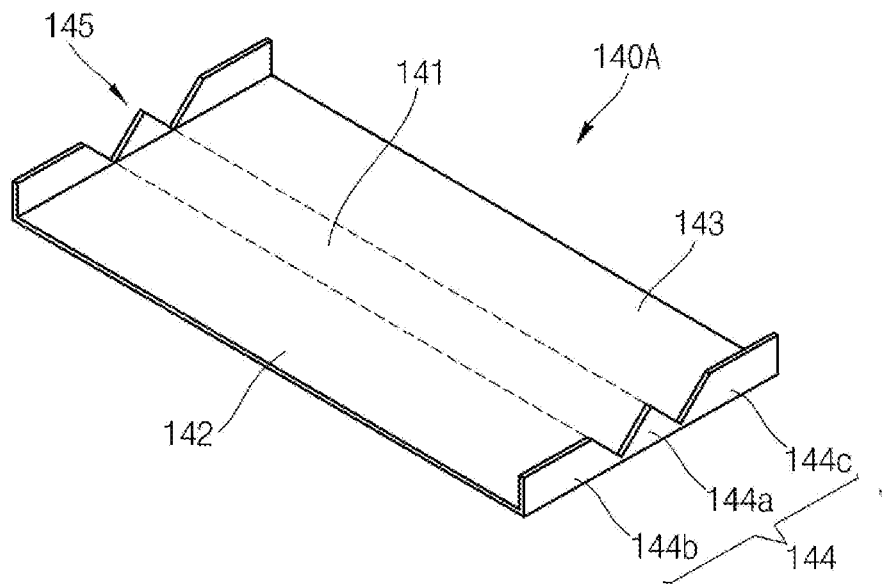
Figure 6C:
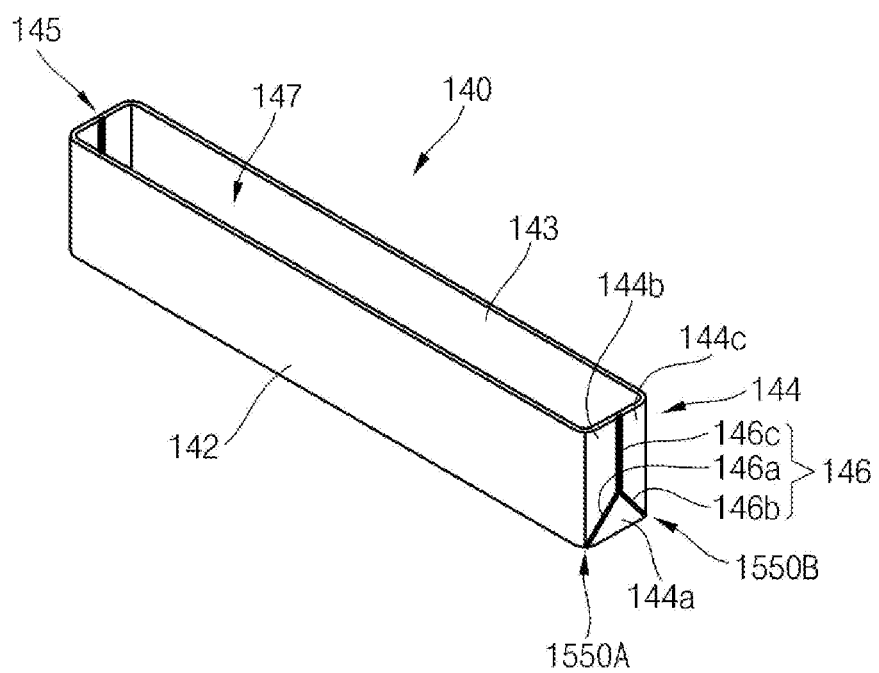

FIGS. 6A to 6C are perspective views illustrating a method for manufacturing a secondary battery according to an example embodiment of the present invention. FIGS. 6A and 6B show the can 140 at a later stage of manufacture. In the example shown in FIGS. 6A and 6B, the metal plate 140A may be bent in a shape (e.g., a predetermined shape). In some examples, the metal plate 140A may be bent in a shape (e.g., a predetermined shape) after it is fixed by a bending machine or a press mold.

In some examples, the long side portions 142 and 143 bent and extended from the respective long sides of the bottom portion 141 in a substantially perpendicular direction, and the short side portions 144 and 145 bent and extended from the bottom portion 141 and the long side portions 142 and 143 in a substantially perpendicular direction, may be provided as the result of the bending process. That is, in an embodiment, the long side portions 142 and 143 may be bent approximately 90 degrees from the long sides of the bottom portion 141 to be extended. The short side portions 144 and 145 may be bent approximately 90 degrees from the short sides of the bottom portion 141 to be extended and may be bent approximately 90 degrees from the long side portions 142 and 143 to be extended.

Therefore, the first short side portion 144a, the second short side portion 144b, and the third short side portion 144c may be positioned to face one another and their peripheries may be matched and brought into contact with one another. In an embodiment, a vertex angle between the upper periphery of the first short side portion 144a and the short side of the bottom portion 141 may be in a range from approximately 40 degrees to approximately 50 degrees, and, in an embodiment, 45 degrees. In addition, an angle of a vertex of the first short side portion 144a, facing the second and third short side portions 144b and 144c, may be in a range from approximately 80 degrees to approximately 100 degrees, and, in an embodiment, 90 degrees.

In some examples, an angle defined between each of two upper peripheries of the first short side portion 144a and the short side of the bottom portion 141 may be in a range from approximately 40 degrees to approximately 50 degrees, and, in an embodiment, 45 degrees, an angle defined between the periphery of the second short side portion 144b facing an end of the periphery of the first short side portion 144a and an end of the long side portion 142 may be in a range from approximately 40 degrees to approximately 50 degrees, and, in an embodiment, 45 degrees, and an angle defined between the periphery of the third short side portion 144c facing another end of the periphery of the first short side portion 144a and an end of the long side portion 143 may be in a range from approximately 40 degrees to approximately 50 degrees, and, in an embodiment, 45 degrees. Accordingly, a vertex at which the bottom portion 141, the end of the long side portion 142, the first short side portion 144a, and the second short side portion 144b meet, and a vertex at which the bottom portion 141, the end of the long side portion 143, the first short side portion 144a, and the third short side portion 144c meet, may be bent in a substantially round shape.

In some examples, a pair of asymmetrical protrusions 1440A (1441 and 1442) are provided at a region or vertex where the first short side portion 144a and the second short side portion 144b meet, and a pair of asymmetrical protrusions 1440B (1441 and 1443) are provided at a region or vertex where the first short side portion 144a and the third short side portion 144c meet, thereby providing a curved portion 1550A (see FIG. 6C) at a region where the bottom portion 141, the long side portion 142, and the short side portions including the first short side portion 144a having the first protrusion 1441 and the second short side portion 144b having the second protrusion 1442, meet, and a curved portion 1550B (see FIG. 6C) at a region where the bottom portion 141, the long side portion 143, and the short side portions including the first short side portion 144a having the first protrusion 1441 and the third short side portion 144c having the third protrusion 1443, meet.

FIG. 6B shows an example in which the short side portions 144 and 145 are bent from the long side portions 142 and 143, respectively. That is, FIG. 6B shows an example in which the long side portions 142 and 143 have yet to be bent from the bottom portion 141.

FIG. 6C shows the can 140 at a later stage of manufacture. In the example shown in FIG. 6C, a bending process and a welding process may be performed.

Similarly as above, in some examples, when the long side portion 142, the first short side portion 144a, and the second short side portion 144b are bent with respect to the bottom portion 141, the protrusions 1440A, i.e., the first protrusion 1441 and the second protrusion 1442, are positioned to overlap with each other or to be piled up one on another, thereby providing the symmetrical curved portion 1550A at a corner where the bottom portion 141, the long side portion 142, the first short side portion 144a, and the second short side portion 144b meet.

In addition, in some examples, when the long side portion 143, the first short side portion 144a, and the second short side portion 144b are bent with respect to the bottom portion 141, the protrusions 1440B, i.e., the first protrusion 1441 and the third protrusion 1443, are positioned to overlap with each other or to be piled up one on another, thereby providing the symmetrical curved portion 1550b at a corner where the bottom portion 141, the long side portion 143, the first short side portion 144a, and the third short side portion 144c meet.

In addition, in some examples, welding portions 146 may be provided in the short side portions 144 and 145. In some examples, the welding portions 146 may include a first welding portion 146a, a second welding portion 146b, and a third welding portion 146c. The first welding portion 146a may be located at a boundary region between the first short side portion 144a and the second short side portion 144b and may extend from the curved portion 1550A provided at a corner where the bottom portion 141, the long side portion 142, the first short side portion 144a, and the second short side portion 144b meet. The second welding portion 146b may be located at a boundary region between the first short side portion 144a and the third short side portion 144c and may extend from the curved portion 1550B provided at a corner where the bottom portion 141, the long side portion 143, the first short side portion 144a, and the third short side portion 144c meet. The third welding portion 146c may be located at a boundary region between the second short side portion 144b and the third short side portion 144c.

In other words, the first welding portion 146a may be at an acute angle with respect to a short side of the bottom portion 141 in the curved portion 1550A where the bottom portion 141, the end of the long side portion 142, the first short side portion 144a, and the second short side portion 144b meet, and the second welding portion 146b may be at an acute angle with respect to the short side of the bottom portion 141 in the curved portion 1550b where the bottom portion 141, the end of the long side portion 143, the first short side portion 144a, and the third short side portion 144c meet. In addition, the third welding portion 146c may be extended from a bottom end of the second and third short side portions 144b and 144c to a top end (i.e., an opening 147) of the second and third short side portions 144b and 144c.

In some examples, the first and second welding portions 146a and 146b may be consecutively formed, and the third welding portion 146c may then be formed, or vice versa. In an embodiment, the welding process may be performed on the first welding portion 146a, the third welding portion 146c, and the second welding portion 146b in that order; however, the welding order may be reversed. In an embodiment, the welding process performed on the third welding portion 146c may be started from the bottom end and may be terminated at the top end, or vice versa. In some examples, the first, second, and third welding portions 146a, 146b, and 146c may include a butt joint structure, a lap joint structure, an overlay joint structure, or an edge joint structure. In some examples, the welding portions 146 may be in a substantially inverted Y-shaped ("$\wedge$") configuration. In an embodiment, the welding portions 146 may be provided to have a solid-line shape. Therefore, the first short side portion 144a may be securely fixed to the second and third short side portions 144b and 144c due to the first and second welding portions 146a and 146b, and the second and third short side portions 144b and 144c may be securely fixed to each other by the third welding portion 146c.

In an embodiment, the first and second welding portions 146a and 146b connected to each other may be shaped of straight lines having at least one vertex, and the third welding portion 146c may be shaped of a straight line extending from the vertex, where the first and second welding portions 146a and 146b meet, to the opening 147. In an embodiment, a vertex angle defined between the first welding portion 146a and the second welding portion 146b may be in a range from approximately 80 degrees to approximately 100 degrees, and, in an embodiment, 90 degrees. In an embodiment, an angle in a range from approximately 40 degrees to approximately 50 degrees, and, in an embodiment, 45 degrees, may be defined between the first welding portion 146a and the short side of the bottom portion 141, and an angle in a range from approximately 40 degrees to approximately 50 degrees, and, in an embodiment, 45 degrees, may also be defined between the second welding portion 146b and the short side of the bottom portion 141.

As described above, an embodiment of the present invention provides the can 140 configured such that the first short side portion 144a is bent and extended from the bottom portion 141, and asymmetrical protrusions 1440A and 1440B are provided at the vertex (corner) between the first short side portion 144a and the second short side portion 144b and at the vertex (corner) between the first short side portion 144a and the third short side portion 144c, thereby providing symmetrical curved portions 1550A and 1550b, which are desirable, at regions where three or four sides meet, respectively. In addition, the first, second, and third welding portions 146a, 146b, and 146c are provided from the curved portions 1550A and 1550B along interfaces (e.g., cutting lines) between each of the first, second, and third short side portions 144a, 144b, and 144c to be connected to one another to construct a single short side portion 144, thereby providing the can 140 having increased bending and welding workability and improved sealing efficiency to prevent or substantially prevent leakage of an electrolyte.

Here, as a result of the bending process, curved portions may also be provided between the bottom portion 141 and the first short side portion 144a, between the bottom portion 141 and each of the long side portions 142 and 143, between the long side portion 142 and the second short side portion 144b, and between the long side portion 143 and the third short side portion 144c.

In some examples, as described above, the curved portion 1550A having a round shape may be provided at the corner where the bottom portion 141, the long side portion 142, the first short side portion 144a and the second short side portion 144b meet by the asymmetrical protrusions 1440A. In addition, as described above, the curved portion 15506 having a round shape may be provided at the corner where the bottom portion 141, the long side portion 143, the first short side portion 144a and the third short side portion 144c meet by the asymmetrical protrusions 1440B. In some examples, the curvature radii of the curved portions 1550A and 1550B located at regions where three or four sides meet may be smaller than those of the curved portions located at regions where the two sides meet, thereby providing the generally stable can 140.

In some examples, prior to formation of the welding portions 146, a temporary welding portion may first be provided at a boundary region between the first short side portion 144a and the second short side portion 144b, a boundary region between the first short side portion 144a and the third short side portion 144c, and/or a boundary region between the second short side portion 144b and the third short side portion 144c. In an embodiment, the temporary welding portion may include multiple temporary welding portions spaced apart from one another. In some examples, the temporary welding portions may be provided to have substantially dotted-line shapes. The temporary welding portions may prevent or substantially prevent spring back phenomena from occurring to the long side portions 142 and 143, the short side portions 144 and 145 and the bottom portion 141. In addition, the temporary welding portions can securely fix the long side portions 142 and 143 and the short side portions 144 and 145 to each other. Accordingly, the main welding portions 146 (i.e., the welding portions 146) can be easily provided. In an embodiment, the temporary welding portions may be provided by ultrasonic welding or resistance welding, as well as laser welding.

Figure 7A:
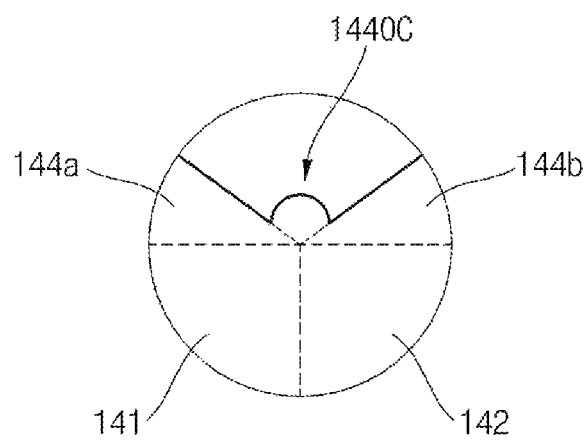
FIGS. 7A and 7B are partially enlarged plan views illustrating a method for manufacturing a secondary battery according to an example embodiment of the present invention.
Figure 7B:
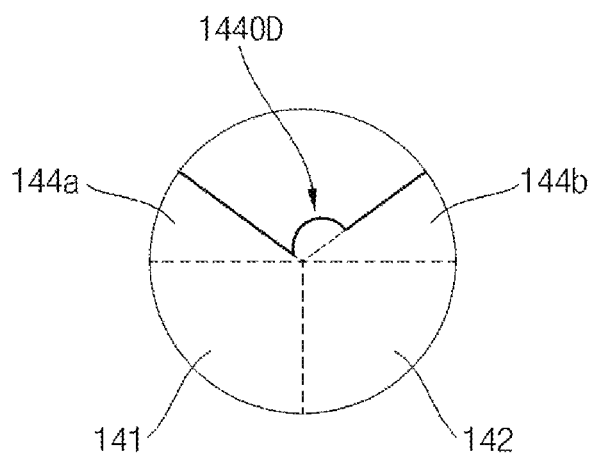

FIGS. 7A and 7B are partially enlarged plan views illustrating a method for manufacturing a secondary battery according to an example embodiment of the present invention. As shown in FIG. 7A, in some examples, a protrusion 1440C may be provided substantially at the center of a region where a first short side portion 144a and a second short side portion 144b (or a third short side portion) meet. In some examples, the protrusion 1440C may be provided substantially at the center of the region where the first short side portion 144a and the second short side portion 144b (or the third short side portion) meet, in a substantially symmetrically round shape, but the shape of the protrusion 1440C is not limited thereto. Rather, the protrusion 1440C may have any of the shapes of the above-described protrusions.

As shown in FIG. 7B, in some examples, a protrusion 1440D may be connected longer (or more widely) to the second short side portion 144b (or the third short side portion) than to the first short side portion 144a. In some other examples, the protrusion 1440D may be connected longer (or more widely) to the first short side portion 144a than to the second short side portion 144b (or the third short side portion). Accordingly, in some examples, the protrusion 1440D may have an asymmetric configuration around a region where the first short side portion 144a and the second short side portion 144b meet (e.g., a vertex or a corner). Similarly as above, the protrusion 1440D may be provided in a substantially round shape, but the shape of the protrusion 1440D is not limited thereto. Rather, the protrusion 1440D may have any of the shapes of the above-described protrusions.

As described above, in an embodiment, when a metal plate is blanked and/or notched, the protrusions 1440A, 1440B, 1440C and 1440D, may be integrally formed at the boundary region between the first short side portion 144a and the second short side portion 144b or at the boundary region between the first short side portion 144a and the third short side portion 144c.

However, in some examples, the protrusions 1440A, 1440B, 1440C, and 1440D may be separately provided (for example, provided as individual pieces) to then be inserted or connected to the boundary region between the first short side portion 144a and the second short side portion 144b or the boundary region between the first short side portion 144a and the third short side portion 144c.

In addition, in some examples, the long side portions 142 and 143 and the first short side portion 144a are bent from the bottom portion 141, and the second and third short side portions 144b and 144c are bent from the long side portions 142 and 143, as described above, the protrusions 1440A, 1440B, 1440C, and 1440D, to then be inserted or connected to the corners of three or four sides, where these side portions meet (for example, a region where the first short side portion 144a and the second short side portion 144b meet, and a region where the first short side portion 144a and the third short side portion 144c meet).

In addition, in some examples, the protrusions 1440A, 1440B, 1440C, and 1440D, which are separately provided and inserted or connected between the first and second short side portions 144a and 144b, and the protrusions 1440A, 1440B, 1440C and 1440D, which are inserted or connected between the first and third short side portions 144a and 144c, may be integrated with the can 140 through a welding process.

As described above, since the protrusion(s) are located at the regions where the first short side portion bent from the bottom portion and the second and third short side portions bent from the long side portions meet, desirably shaped curved portions in a symmetric configuration may be provided by the protrusions when the first short side portion and the second and third short side portions are bent. In addition, since the desirably shaped curved portions in a symmetric configuration are provided by the protrusion(s) and distances between boundary regions of the curved portions and the first, second, and third short side portions are reduced, welding can be easily performed, thereby preventing or substantially preventing pinholes from being generated at the boundary regions. In addition, when multiple batteries are assembled or stacked to manufacture a battery module or pack at a later stage, the symmetrical curved portions may not interfere with other batteries, thereby preventing or substantially preventing insulation breakdowns from occurring among the batteries. However, if the curved portions are asymmetrically configured, insulation layers of other neighboring batteries may be damaged by the asymmetrical curved portions, resulting in insulation breakdowns among the neighboring batteries.

While the secondary battery of the present invention has been particularly shown and described with reference to some example embodiments thereof, it will be understood by those of ordinary skill in the art that various changes in form and details may be made therein without departing from the spirit and scope of the present invention as set forth by the following claims.

What is claimed is:

1. A secondary battery comprising:
an electrode assembly;
a case accommodating the electrode assembly; and
a cap assembly coupled to the case to seal the case,
wherein the case comprises a bottom portion opposite the cap assembly, long side portions bent and extended from the bottom portion, a first short side portion bent and extended from the bottom portion, second short side portions bent and extended from the long side portions, the first short side portion and the second short side portions connected to each other to define a short side portion, and protrusions located between the first short side portion and the second short side portions at regions where the short side portion and the bottom portion meet, and
wherein the case comprises a metal plate that is formed of a metal material, the metal plate comprising the bottom portion, the long side portions, the short side portion, and the protrusions.

2. The secondary battery of claim 1, wherein the protrusions are located at regions where the first short side portion and the second short side portions meet.

3. The secondary battery of claim 1, wherein the protrusions comprise:
a first protrusion located in the first short side portion; and
a second protrusion located in each of the second short side portions.

4. The secondary battery of claim 3, wherein the first protrusion and the second protrusion overlap with each other.

5. The secondary battery of claim 3, wherein the first protrusion and the second protrusion are in an asymmetric configuration.

6. The secondary battery of claim 3, wherein the first protrusion is larger than the second protrusion.

7. The secondary battery of claim 3, wherein the second protrusion is larger than the first protrusion.

8. The secondary battery of claim 3, wherein the first and second protrusions are circular, triangular, quadrangular, pentagonal, or hexagonal.

9. A secondary battery comprising:
an electrode assembly;
a case accommodating the electrode assembly; and
a cap assembly coupled to the case to seal the case,
wherein the case comprises a bottom portion, long side portions bent and extended from the bottom portion, a first short side portion bent and extended from the bottom portion, second short side portions bent and extended from the long side portions, the first short side portion and the second short side portions connected to each other to define a short side portion, and protrusions located between the first short side portion and the second short side portions,
wherein the protrusions comprise:
a first protrusion located in the first short side portion; and
a second protrusion located in each of the second short side portions, and
wherein a curvature radius of the first protrusion is larger than a curvature radius of the second protrusion, or the curvature radius of the second protrusion is larger than the curvature radius of the first protrusion.

10. A secondary battery comprising:
an electrode assembly;
a case accommodating the electrode assembly; and
a cap assembly coupled to the case to seal the case,
wherein the case comprises a bottom portion, long side portions bent and extended from the bottom portion, a first short side portion bent and extended from the bottom portion, second short side portions bent and extended from the long side portions, the first short side portion and the second short side portions connected to each other to define a short side portion, and protrusions located between the first short side portion and the second short side portions,
wherein the protrusions comprise:
a first protrusion located in the first short side portion; and
a second protrusion located in each of the second short side portions,
the secondary battery further comprising curved portions located at regions where the bottom portion, the long side portions, and the short side portion including the first short side portion comprising the first protrusion and the second short side portion comprising the second protrusion, meet.

11. The secondary battery of claim 10, wherein the short side portion further comprises welding portions, and the welding portions comprise a first welding portion located between each of the curved portions and each of the first short side portion and the second short side portions, and a second welding portion located between the second short side portions.

12. The secondary battery of claim 1, wherein the protrusions are located at centers of regions where the first short side portion and the second short side portions meet.

13. The secondary battery of claim 1, wherein the protrusions are connected longer to the first short side portion than to the second short side portions, or the protrusions are connected longer to the second short side portions than to the first short side portion.

14. The secondary battery of claim 1, wherein the protrusions are separately provided to be inserted between the first short side portion and the second short side portions.

15. The secondary battery of claim 1, wherein the first short side portion extends from both end portions of the bottom portion, the second short side portions extend from both ends of the long side portions, and the short side portion is defined on both sides of the bottom portion and the long side portions.

* * * * *